UNITED STATES PATENT OFFICE.

CARL MIJNSSEN, OF WILMERSDORF, GERMANY.

ACETYL-CELLULOSE SHEET.

1,005,454.     Specification of Letters Patent.    Patented Oct. 10, 1911.

No Drawing.     Application filed December 27, 1909. Serial No. 535,123.

*To all whom it may concern:*

Be it known that I, CARL MIJNSSEN, a subject of the Queen of the Netherlands, and resident of Wilmersdorf, in the Kingdom of Prussia, German Empire, have invented new and useful Improvements in Acetyl-Cellulose Sheets, of which the following is a full, clear, and exact specification.

My invention relates to sheets produced with acetyl cellulose and consists in combining on the one hand layers composed of acetyl cellulose and on the other hand layers of ductile and flexible materials. By the term acetyl cellulose I include such mixtures of acetyl cellulose in which the additions do not essentially alter the properties of the product when compared with pure acetyl cellulose. Such combined sheets are especially fit for electrical isolation and photographic purposes as they have the valuable properties of pure acetyl cellulose layers, *i. e.* their great resistance against mechanical actions, their hard surface, great insulating power, small extensibility and relatively great elasticity, but without the brittleness and fragility of pure acetyl cellulose. The second layer of these sheets can be made from any material convenient for the special purpose intended, for instance water insoluble flexible mixtures of nitrocellulose, resins, asphalt, casein, combined with softening substances. Also acetyl cellulose itself can be used for this second layer, when mixed with sufficient quantities of a substance adapted to impart to the mixture sufficient softness and flexibility. Such substances are for instance phenols, chlorhydrins, guayacol, acetin, anilin, acetophenone, and generally all substances that can be used as substitutes for camphor in the manufacture of celluloid. The same substances may be used as softening agents for increasing the softness and flexibility of the other substances fit for producing the soft layer.

It is not necessary to make the layer of the soft substance of the same thickness as the acetyl cellulose layer itself, on the contrary, in some cases it is sufficient, for preventing the acetyl cellulose sheets from becoming brittle, to apply the soft substance in the shape of a very thin layer. Especially, this is sufficient if the sheets are to be stuck on another support, as for some electrical purposes; the soft layer, consisting for instance of soft resins, is thus prevented by the support from being injured and can be made very soft by suitable additions. The soft substance can be applied to the acetyl cellulose layer in a liquid state in the form of a solution or in a molten condition, or it can be applied in a semi-solid state by means of a roller, or finished layers of soft substance can be stuck on the acetyl cellulose layer, a support being used if necessary, or inversely, the acetyl cellulose layer can be applied to the soft layer in the form of a solution or of a sheet. Again, one or both layers can be made in the form of finished sheets or plates and then united by means of a sticking agent, by pressure or by heat. Further, two such double layers can be combined, by joining both soft layers or the soft layer of the one with the hard layer of the other, or two layers of pure acetyl cellulose can be joined by an intermediate layer of soft substance. All plates obtained in this or in any other similar way by combining hard acetyl cellulose layers with soft layers of suitable material possess the nearly undiminished properties and character of pure acetyl cellulose, its hard surface, great resistance against mechanical action, limited extensibility, high insulating power, etc., but have a much greater strength of extension and are less brittle than pure acetyl cellulose.

In practically carrying out my invention I proceed, for instance, as follows:

Example 1: A 20 per cent. solution of acetyl cellulose in acetone is uniformly poured on a polished metal plate in a thick layer and then allowed to evaporate. On the remaining hard sheet a thin layer of standard varnish is applied and allowed to dry completely at a temperature of from 60 to 80 degrees centigrade.

Instead of using standard varnish the soft layer can be made by pouring on the layer of hard acetyl cellulose first produced a solution of 100 parts of acetyl cellulose in 800 parts of chloroform and 100 parts of alcohol, 60 parts of acetophenone being added as a softening agent to this solution. After evaporation of this solution the sheet is ready for use.

Example 2: A solution of acetyl cellulose in chloroform or acetone or any other suitable solvent is uniformly poured on a glass plate so as to leave, after evaporation of the solvent, a layer of about 0.1 millimeter thickness. On this layer a solution of nitrocellulose in a mixture of equal parts of ether and alcohol is applied and then allowed to evaporate. In order to obtain more ductility and softness from 50 to 100 per cent. of a phenol (in proportion to the quantity of nitrocellulose) are added to this solution. The application of this solution may be repeated once or more times to obtain a greater thickness if necessary. Then a second acetyl cellulose layer is applied by pouring a solution of acetyl cellulose in chloroform or acetone or the like on the nitrocellulose-phenol layer and allowing the solvent to evaporate. Thus, a plate of about 0.25 millimeter thickness is obtained, having all properties of pure acetyl cellulose, but without its brittleness.

Instead of the nitrocellulose solution above referred to a 20 per cent. solution of acetyl cellulose in acetone containing 50 per cent. of acetin (in proportion to the quantity of acetyl cellulose) as a softening agent may be used.

What I claim is:—

1. As a new article of manufacture, sheets composed of two external layers of acetyl cellulose united by an intermediate layer of a soft extensible and flexible substance insoluble in water.

2. As a new article of manufacture, sheets composed of a layer of acetyl cellulose and a layer of acetyl cellulose containing a softening agent.

3. As a new article of manufacture, sheets composed of two external layers of acetyl cellulose and an intermediate layer of acetyl cellulose containing a softening agent.

4. An article of the character described, comprising a layer of acetyl cellulose united to a transparent layer of soft, extensible, and flexible material insoluble in water.

5. An article of the character described, comprising a layer of acetyl cellulose and a second layer of said substance containing a phenol compound as a softening agent.

6. An article of the character described, comprising a layer of acetyl cellulose and a second layer of said substance containing acetophenone as a softening agent.

In testimony, that I claim the foregoing as my invention, I have signed my name in presence of two subscribing witnesses.

CARL MIJNSSEN.

Witnesses:
HENRY HASPER,
WOLDEMAR HAUPT.